United States Patent [19]

Bello

[11] 4,307,441
[45] Dec. 22, 1981

[54] CURRENT BALANCED DC-TO-DC CONVERTER

[75] Inventor: Vincent G. Bello, Norwalk, Conn.

[73] Assignee: United Technologies Corporation, Hartford, Conn.

[21] Appl. No.: 172,873

[22] Filed: Jul. 28, 1980

[51] Int. Cl.³ .............................................. H02M 3/335
[52] U.S. Cl. ........................................ 363/25; 363/97
[58] Field of Search ................. 363/25, 26, 56, 97, 363/DIG. 1

[56] References Cited

U.S. PATENT DOCUMENTS

| | | | |
|---|---|---|---|
| 3,657,631 | 4/1972 | Martens et al. | 363/26 |
| 3,859,583 | 1/1975 | Reed | 363/26 |
| 4,148,097 | 4/1979 | Deisch | 363/26 |
| 4,162,524 | 7/1979 | Jansson | 363/25 |

*Primary Examiner*—William M. Shoop
*Attorney, Agent, or Firm*—Richard P. Lange

[57] ABSTRACT

A novel feedback circuit for use in a DC-to-DC converter accurately adjusts the pulse width of the control pulses to a pair of switching transistors to minimize current imbalance. The switching transistors generate current pulses in the primary windings of a center tapped transformer. The feedback path senses the current pulses in the primary circuit of the transformer. A filter in the feedback path has a bandwidth centered at about the frequency of any current imbalance. The high gain, closed loop feedback path changes the slope of alternate linear ramp voltage pulses, and hence varies the pulse width of the pulses presented to the control terminals of the switching transistors.

7 Claims, 1 Drawing Figure

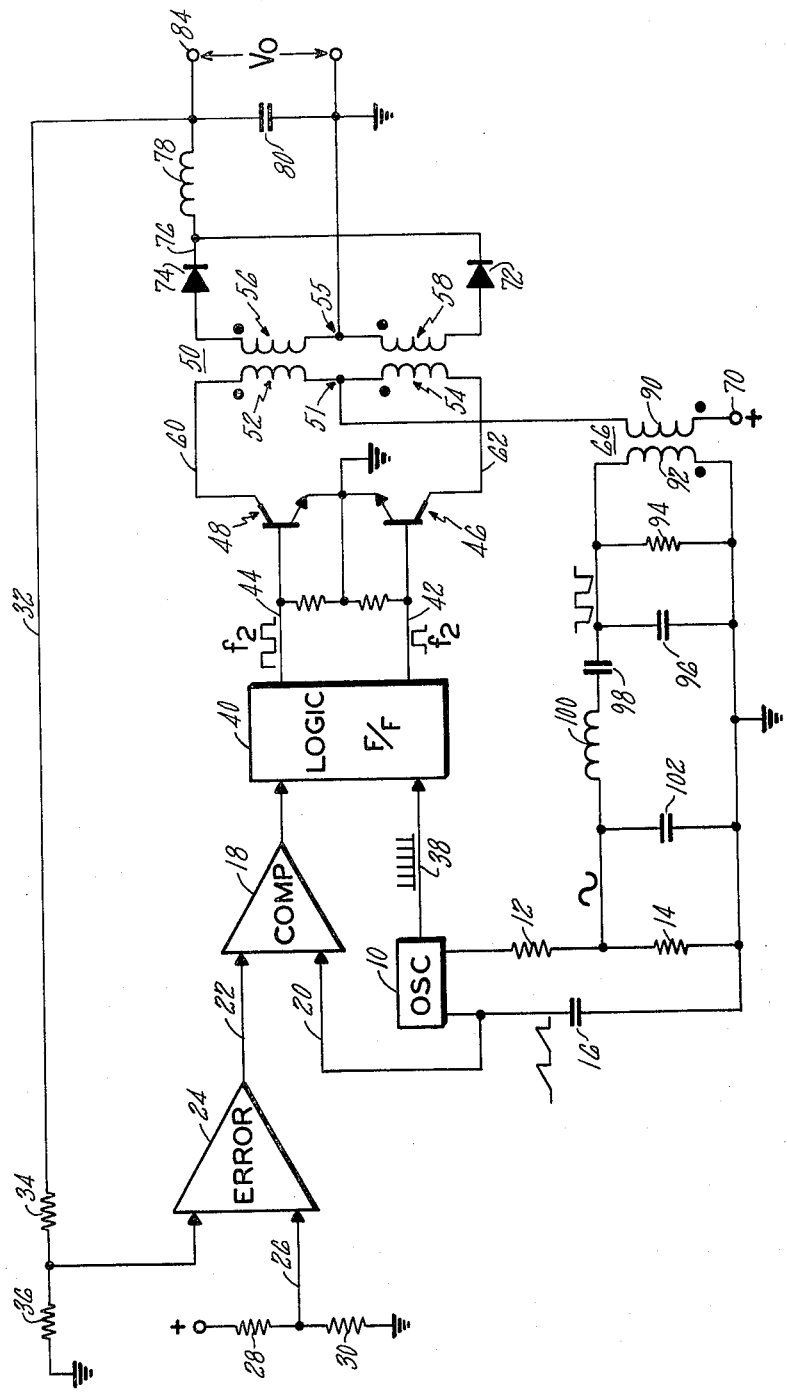

CURRENT BALANCED DC-TO-DC CONVERTER

DESCRIPTION

1. Technical Field

This invention relates to DC-to-DC converters, and more particularly, to a pulse-width controlled DC-to-DC converter having a pair of transistor switches connected in a push-pull configuration through an output transformer in which a feedback path decreases current imbalance resulting from transistor mismatch.

2. Background Art

DC-to-DC converters are generally known and are devices for converting a DC voltage at one level to a DC voltage at another level. Such devices also can act as a regulated power supply to provide a constant output voltage where the input voltage varies over a wide range.

One type of DC-to-DC converter is known as a pulse-width controlled DC-to-DC converter and includes a pair of switching transistors connected in a push-pull manner to generate a pair of waveforms having alternating pulses. These waveforms are presented through each half of the primary of a center tapped transformer. The secondary side of the transformer is also center tapped and the transformed pulses are rectified by a pair of diodes. An output filter integrates the rectified signal to form the final DC output voltage. A feedback loop is formed by sensing the deviation of the output voltage level from a reference voltage to form an error signal. This error signal then varies the width of the pulses presented to the switching transistors.

One such DC-to-DC converter is described in an article entitled "Overcurrent Protection in Pulse-Width Controlled DC-DC Converters" by J. C. Wadlington in the *Power Electronics Specialists Conference* 76, pp. 289-296, June 8-10, 1976, Cleveland, Ohio. This DC-to-DC converter includes protection against various transient overcurrents. The circuit uses a 20 kilohertz pulse-width control circuit with a push-pull amplifier. As is recognized, the most critical active components for proper operation of these circuits are the switching transistors of the push-pull amplifier. Current limiting is necessary to protect the switching transistors against overcurrent stresses.

In addition to current limiting, the foregoing article also recognizes the need for symmetry correction of the current amplitudes flowing through the switching transistors during each of the two half cycles. Symmetry between the current pulses is maintained by making the width of the alternating drive pulses unequal, thus, counteracting any imbalances inherent in the switching transistors. The driving pulses can be made unequal by making the slope of the sawtooth waveform proportional to the amplitude of the primary current pulses.

Another DC-to-DC converter is described in an article entitled "Simplifying Converter Design With a New Integrated Regulating Pulse Width Modulator" by Bob Mammano, published in a catalog by *Silicon General* in June 1976. The article describes a monolithic integrated circuit chip which contains all the control circuitry for a regulated power supply converter or switching regulator. The circuit is useful as a switching regulator of either polarity, a transformer coupled DC-to-DC converter, a transformer-less voltage doubler or a polarity converter. One particular configuration for a push-pull DC-to-DC regulating converter is shown in FIG. 21 of the Mammano article. The integrated circuit, known as the SG1524, interfaces with externally connected circuitry, this including a pair of transistors connected in a common emitter configuration. Pulses are supplied through a center tapped transformer to a rectifier and filter which integrate the pulses to a DC voltage level. If the storage time of the transistors are unequal, current imbalance can exist as a result of non-symmetric current pulses in the collector/emitter circuit. This current imbalance can cause saturation of the transformer and buildup of DC current in the primary winding of the transformer that overstresses the switching transistors.

DISCLOSURE OF THE INVENTION

It is an object of the present invention to provide a DC-to-DC converter which includes a feedback circuit for accurately maintaining the current balance through switching transistors connected in series with the primary windings of a transformer.

A feature of the DC-to-DC converter according to the present invention is that it corrects for the inherent deviation in storage time or saturation voltage between a pair of transistors connected as a push-pull amplifier to drive the center tapped primary of a transformer. A filter tuned to 20 kilohertz forms a feedback signal which is presented to the ramp voltage input of the oscillator. In turn, this varies the ramp voltage waveform, and hence the pulse width of the control pulses from the logic flip flop to the switching transistors thereby improving current imbalance.

According to another feature of the present invention, a feedback signal is formed by sensing the current pulses through a push-pull amplifier comprised of switching transistors coupled across the primary of a transformer. The feedback path is such as to maintain a high loop gain at the frequency of current imbalance and adjusts the pulse width of the respective pulse waveforms presented to the switching transistors to minimize the effect of any deviation in the storage time or saturation voltage of the transistors.

A particular feature of the present invention involves the use of a feedback signal to slightly change the slope of a ramp voltage waveform, thus increasing or decreasing the width of the control pulses to a pair of switching transistors. The feedback signal is derived by sensing the current pulses through the switching transistors in a transformer and filtering the same to derive a signal waveform whose primary frequency content is at the frequency of the current imbalance. Because the feedback signal only contains the error signal associated with the current imbalance, a high gain, closed feedback loop can be employed to accurately drive the current imbalance to zero.

An advantage of the present invention is that a feedback signal is related primarily to the current imbalance of a pair of switching transistors in a DC-to-DC converter. In operation, this feedback signal is employed in a high gain feedback loop to drive any current imbalance to zero. In this closed loop, high gain configuration, the feedback signal has a relatively low amplitude during operation of the converter so that no unexpected signal can affect the normal operation of the DC-to-DC converter.

Still another feature of the feedback path according to the present invention for use in a DC-to-DC converter is that it is a high gain, narrow bandwidth feedback path through which a feedback signal is generated. This feedback signal is then used to modify the ramp voltage waveform of an oscillator that generates controlled pulses for a pair of switching transistors. By limiting the bandwidth of the feedback signal to the frequency associated with the current imbalance in the switching transistors, a simple, low cost, passive component can be used for the filter in the feedback path. And yet, a high gain, closed loop feedback path is provided such that the component at the imbalance frequency is driven to zero.

A further advantage of the present invention is that the current balance in a pair of switching transistors is maintained even under short circuit condition. This occurs through the use of a feedback which changes the slope of a linear ramp voltage waveform which does not change during a short circuit, or current limiting, condition.

According to the present invention, a DC-to-DC converter utilizes an integrated circuit, such as the SG1524 Regulated Pulse Width Modulator, in conjunction with a transformer coupled output to provide a highly accurate output voltage level. The accuracy of the output voltage is maintained over a wide range of input voltages. Any DC imbalance in the primary of the transformer is corrected by sensing the primary current pulses; filtering the sensed current in a filter tuned to one half of the frequency of the oscillator; and presenting this signal to one end of the resistor which controls the linear ramp voltage waveform of the oscillator in the Regulating Pulse Width Modulator. In turn, this causes a slight dissymetry in the width of alternate pulses which are presented to the switching transistors, thus insuring the output transformer is not driven into DC saturation.

The foregoing and other objects, features and advantages of the present invention will become more apparent from the following description of preferred embodiments and accompanying drawing.

BRIEF DESCRIPTION OF THE DRAWING

The sole FIGURE is a partial schematic diagram of a DC-to-DC converter including the novel feedback configuration according to the present invention for minimizing current imbalance due to variation of transistor storage time and saturation voltage.

BEST MODE FOR CARRYING OUT THE INVENTION

The present invention incorporates a feedback configuration in a DC-to-DC converter to decrease the current imbalance in a push-pull amplifier. This push-pull amplifier drives the primary winding of a transformer and is comprised of a pair of switching transistors. These active elements are subject to overcurrent stressing, and this stressing will increase the likelihood of converter failure. There are several potential sources of overcurrent which must be considered in the design of a DC-to-DC regulator to ensure long lasting reliable operation. For example, in the event of a sudden short circuit at the output of a DC-to-DC converter, the dramatic decrease in secondary impedance can cause a transient current in the primary circuit which has a rapid rate of change. Accordingly, in order to limit the magnitude of the primary current transients in the event of a short circuit, one well known method is to select a value for the inductor in the output filter so as to sufficiently damp, or limit the rate of change, of the secondary current.

Another condition that can overstress the switching transistors is related to saturation of the output transformer of the converter. One reason for saturation of the transformer results from a current imbalance in the primary windings of the transformer across which the switching transistors are connected. If the storage time or saturation voltage of the transistors are mismatched, one of the transistors will remain in a conducting state slightly longer than the other transistor. In turn, this causes the current pulses through respective halves of the primary winding to be asymmetric, or unequal, resulting in a buildup of DC current. One prior art method of correction for such imbalance has been to vary the width of the pulses presented to each of the switching transistors. However, previously known compensating methods for precisely adjusting the pulse width of the control signals presented to the transistors have not maintained the requisite high loop gain while precisely adjusting the pulse width.

Referring now to the sole FIGURE of the drawing, a DC-to-DC converter which employs a feedback circuit according to the present invention will now be described. An oscillator 10 uses an external resistance, such as resistor 12 and resistor 14, to establish a constant charging current into an external capacitor 16. This constant charging current provides a linear ramp voltage, or sawtooth, across the capacitor 16. A comparator 18 has one input coupled by a lead 20 to receive the ramp voltage waveform from the capacitor 16. The other input of the comparator 18 is connected by a lead 22 to the output of an error amplifier 24 which generates a DC feedback signal. The error amplifier 24 includes a pair of inputs, one of which is connected by a lead 26 to a source of reference potential. A well known method for providing a DC reference voltage of any desired level is through the use of a voltage divider. A resistor-type voltage divider includes a pair of resistors 28 and 30 which are connected in series across a source of DC potential, such as a battery or power supply. A lead 26 would be coupled to the line connecting the two resistors, as shown, and the DC voltage level on the line 26 would be established by the ratio of the resistance values of the resistors 28 and 30. A DC voltage is fed back from the output of the DC-to-DC converter via a line 32 to the other input of the error amplifier 24. If required, a voltage divider, such as that formed by a resistor 34 and a resistor 36, can be used to appropriately scale the DC voltage level fed back to the error amplifier 24.

The oscillator 10 provides a clock pulse on the line 38 which is presented to a logic flip flop 40. Typically, the output is a narrow pulse which occurs each time the capacitor 16 is discharged. Accordingly, the width separating each of these output pulses is controlled by the values of the resistors 12 and 14 and the capacitor 16. These current pulses are used by the logic flip flop 40 to create two pulse width modulated signal waveforms, the first being that on a line 42 and the second being that on a line 44. The output frequency of each signal waveform is $f_2$ which is onehalf of the output frequency $f_1$ of the oscillator 10. A pair of transistors 46 and 48 are connected in a push-pull configuration with their emitters connected to ground. An output transformer 50 has a center tap 51 forming two primary windings 52 and 54. The secondary side also has a center tap 55 forming two secondary windings 56 and 58. The primary windings 52 and 54 are connected in series by leads 60 and 62 across the emitter/collector path of the transistors 46 and 48, these windings being wound in the direction shown in the drawing. The center tap 51 on the primary side of the transformer 50 is connected through a sensing transformer 66 to a DC source of reference potential connected at terminal 70 and ground. The secondary windings 56 and 58 each have one end connected by the center tap 55 while the other end of each winding is connected through a diode 72 and a diode 74, respectively, to rectify the current pulses out of the output transformer 50. A line 76 coupled to the cathodes of each of the diodes 72 and 74 has a DC output voltage thereon. A filter, such as comprised of a series connected inductor 78 and a capacitor 80, essentially integrates the pulses to provide a substantially constant DC output voltage level. As the load current varies in operation, the duty cycle of the current pulses through the output transformer 50 is correspondingly changed and the DC output voltage level is maintained at its preselected level.

The just heretofore described DC-to-DC converter is considered to be a general discussion of the active components in a pulse width modulated DC-to-DC converter, all of which are well known to those of ordinary skill. Such a DC converter could be totally assembled from discrete components, or the more recent monolithic integrated circuitry could be used, the details of either approach is so well known it is considered unnecessary to describe the engineering design details here. However, with regard to the use of a monolithic integrated circuit, one unit known is the SG1524 series of Regulating Pulse Width Modulators which can be effectively used to implement the just described pulse width modulated DC-to-DC converter. The SG1524 integrated circuit is a convenient circuit package because it contains all of the control circuitry in a convenient sixteen pin dual-in-line package which is generally lower in cost than a comparable circuit with discrete components. A more comprehensive description of the design data related to the SG1524 series of Regulating Pulse Width Modulators integrated circuits can be obtained by referring to the manufacturer's engineering design information, some of which is cited in the above background section.

A particular aspect of the present invention relates to a feedback path for use with the just described DC-to-DC converter to minimize the current imbalance associated with the switching transistors 46 and 48. As mentioned, the switching transistors are fed by a series of pulses from the logic flip flop 40 which alternatively switch the transistors between their conducting and nonconducting states. As is well known, even if the control terminal of each transistor is supplied with control pulses of substantially the same pulse width, the length of time that each transistor remains in its conducting state can vary due to a difference in storage time between the two transistors. Because the transistors 46 and 48 are connected in a push-pull configuration, this can result in a variation in the current pulses through each primary winding 52 and 54 which can cause a DC current component that saturates the transformer 50. In turn, this imbalance creates current spikes, or short pulses, that can cause overcurrent stressing of the switching transistors due to the high amplitude current therethrough. As mentioned, the magnitude of the current imbalance is directly related to the difference in storage time or saturation between the two transistors.

The present invention corrects the current imbalance due to the difference in storage time of the two transistors 46 and 48 through the use of a high gain, closed loop feedback path which forms an error signal associated with only the imbalance current and drives the imbalance to zero through the operation of this feedback loop. The feedback path includes the transformer 66 connected to cause the primary current pulses to pass to ground. The transformer 66 includes a primary winding 90 which is coupled in the path from the center tap 64 of the transformer 50 to the terminal 70. A secondary winding 92 is also provided and, in preferred form, the turns ratio is relatively high, such as 400 to 1, to create a signal with a high amplitude across a resistor 94 that is proportional to the converter current. A capacitor 96 is connected in parallel across the resistor 94 to filter out noise at higher frequency, such as beyond 100 kilohertz. The feedback path further includes a capacitor 98 and an inductor 100 connected in series. The value of the capacitor 98 and the inductor 100 are selected to resonate at the imbalance frequency of the switching transistors. The feedback path is connected between the resistors 12 and 14 which, together with the capacitor 16, generate the ramp voltage waveform, as hereabove described. A capacitor 102 can also be provided across the resistor 16 to further assist in filtering out signals above the frequency of the imbalance signal.

In operation, the signal fed back through this high gain feedback path is related only to the frequency of the current imbalance error signal, and by the closed loop feedback path this imbalance signal is essentially driven to zero or nearly so. By presenting this signal to the resistor 14 which is used by the oscillator 10 to form the linear ramp voltage waveform, the inclination of the ramp portion of alternate sawtooth pulses are modified slightly in such a manner as to slightly change the width of the pulses presented to the control terminals of the switching transistors 46 and 48. In other words, the width of the pulses presented to the switching transistors are varied in such a manner that the current imbalance due to variation in storage time of the switching transistors is driven to zero.

A particular feature of the present invention is that the high gain feedback path for minimizing current imbalance due to variation in storage time of the transistors does not adversely affect the normal operation of the DC-to-DC converter. This is because the feedback signal has a frequency that is related only to the imbalance current and the signal components outside of this frequency range are filtered out of the feedback signal. Accordingly, any signals unrelated to current imbalance which would tend to render the closed loop unstable have no effect on the operation of the DC-to-DC converter.

Although this invention has been described in detail with respect to the preferred embodiment shown in the figure, it should be understood by those skilled in the art that various changes in form and detail may be made without departing from the scope and spirit of the claimed invention. For example, rather than the series resonant LC filter as described above in the feedback path of the present invention, numerous other types of filters could be used. One of the best known would be an active RC filter tuned to the frequency of interest since a high loop gain is desirable. However, this and other filters are so well known to one of ordinary skill that further description thereof is deemed unnecessary.

I claim:

1. A DC-to-DC converter, comprising:
   oscillator means for providing a linear ramp voltage waveform;
   pulse means connected to said oscillator means for providing a pair of pulse waveforms, each waveform having a pulse alternating with the other in a push-pull manner;
   switch means including a pair of transistor switches, each having a control terminal for transitioning each of said transistor switches between its conducting and nonconducting state, said pair of transistor switches being connected in a push-pull configuration with said control terminals connected to receive one of said pair of pulse waveforms;
   a means including a transformer having a primary winding and a secondary winding, said primary winding connected to said pair of transistor switches to form a primary circuit through which current pulses pass;
   feedback means connected to said primary winding for sensing said current pulses therethrough, and including a filter whose bandpass characteristic is related to the frequency of any current imbalance associated with said pair of transistor switches to provide a high gain feedback signal to said oscillator means to change alternate ones of said linear ramp voltage waveform in response to any imbalance in current pulses; and
   whereby current imbalance in said primary circuit due to any mismatch in the storage time or saturation voltage of said pair of transistor switches is minimized.

2. A DC-to-DC converter according to claim 1, wherein said filter includes an inductor and capacitor connected in series, and wherein the values of said inductor and said capacitor are such as to resonate at the frequency of any current imbalance signal waveform.

3. A DC-to-DC converter according to claim 2, further including a capacitor connected in said feedback to filter out high frequency signals.

4. A DC-to-DC converter according to claim 1, wherein said primary winding of said transformer includes a center tap through which current pulses are coupled to ground, and wherein said pair of transistors connected across said primary winding in a push-pull configuration, and wherein a current sensing transformer is coupled in series with said center tap of said transformer to sense current pulses passing therethrough.

5. A DC-to-DC converter according to claim 1, wherein said oscillator means further includes a pair of series connected resistors, and a capacitor, both of which generate said linear ramp voltage waveform, the slope of which is related to the values thereof, and wherein said feedback path supplies a signal of a frequency related to any current imbalance to said pair of resistors, thereby varying the slope of alternate linear ramp voltage waveforms.

6. A DC-to-DC converter according to claim 1, wherein said secondary winding is connected through a pair of diodes to provide unidirectional current pulses in a secondary circuit that are related to said current pulses in said primary circuit.

7. A DC-to-DC converter according to claim 6, further including a filter means for filtering said unidirectional pulses into a substantially DC output waveform.

* * * * *